United States Patent Office 2,825,652
Patented Mar. 4, 1958

2,825,652

CONTROL FREEZING OF MEAT

Leonard I. Berkowitz, Newton, Mass., assignor to L. B. Darling Company, Inc., Worcester, Mass., a corporation of Massachusetts No Drawing. Application June 7, 1954
Serial No. 435,076

5 Claims. (Cl. 99—194)

This invention relates to a method of freezing meats, and more particularly to a method of freezing and packaging meats which will retain flavor, texture, color, quality, and other desirable characteristics of the meat.

It is standard practice to freeze meats for preservation and storage. Under ordinary freezing procedures, the freshly cut meat undergoes a change in the presence of air wherein hemoglobin or myoglobin is converted to oxyhemoglobin or oxymyoglobin, which changes the dull purplish color of freshly killed beef to the bright red color considered desirable. Any continued freezing or storage of the meat tends to darken it in color, due presumably to continued oxidation of the oxyhemoglobin or oxymyoglobin, into methemoglobin or metmyoglobin, which are responsible for the undesirable brownish or dark colors. The darkening of the meat as caused by a conversion of the pigments is generally associated with deterioration of the meat, and the product has distinctly less desirable qualities and saleability.

The freezing action tends to crystallize the moisture and juices of the meat, and if such frozen meat is not contained in an air-tight package, or when it is removed from the package, there is a loss of juices, flavor and color through dehydration. That is, a precut or prepared piece of meat of the normal bright red color will develop a coating of ice crystals which carry the juices and the flavor of the meat, so that when these crystals evaporate into the outside air, that moisture and flavor is lost and a toughening of the meat results. Further objectionable features accompanying dehydration of meat, referred to as "freezer burn," are that fats immediately underneath the desiccated areas become oxidized and more or less rancid. The proteins become irreversibly dehydrated and consequently the tissues become dry and tough.

Even if frozen meat is not subjected to desiccation, the pigment of the surface layer of red meats is slowly oxidized, causing the change from red to brown. It has heretofore been considered that the meat must be packaged prior to freezing in moisture-vapor-proof containers to retard these changes in color, but such procedures have been found to be of limited value, and do not preserve the red color on prolonged frozen storage. These changes will take place even in the absence of light which also acts to change the color of frozen meats.

One object of my invention is to overcome such disadvantages and to provide a method of freezing and conditioning meat so that it retains its desirable characteristics during storage.

A further object is to freeze and package meats under such conditions that flavor, color and natural juices are preserved in the meat during its entire frozen storage up to preparation for consumption. Other objects will be apparent in the following disclosure.

In accordance with one phase of this invention, the meat, including various meat products, is frozen in a two-stage process, wherein the meat is frozen while exposed to oxidizing conditions for a controlled period of time, which develops the bright red color of oxyhemoglobin or oxymyoglobin and sets the color of the surface layer and preserves the shape of the meat body. The meat is thereafter packaged in an air and moisture impervious envelope and preferably a shrinkable moisture-vapor-proof film and subjected to a vacuum which causes the film to cling tightly to the surface of the meat. The meat thus sealed in its controlled surface-oxidized condition is subjected to a rapid heat treatment which shrinks the film to a skin-tight fit, and at the same time thaws the frozen surface just sufficiently to release a small quantity of the juices contained in the meat against the impervious surface of the film. When the meat is frozen solidly in a second stage in the absence of air, this bright red color remains.

The initial oxidizing and freezing stage may be attained by freezing the meat rapidly in a temperature of about —20° F. to —40° F. by a blast of cold air to form only a hard crust on the meat and set the color by oxidation, but leaving the interior of the meat body only lightly frozen. The body of the meat is technically in a frozen condition and its surface is oxidized in that state. According to another phase of this invention, if the meat is frozen initially at a rapid rate to a fully solid condition at a temperature of, say, —20° F. to —40° F., it may be thereafter "tempered" under conditions which raise the temperature to about 28° F., or the crystallization point of the meat, at which point the desirable oxidation may be achieved under controlled conditions of air contact, but without any appreciable dehydration because the juices are still frozen. In either procedure, the meat acquires a controlled surface oxidation in a frozen condition.

Following the surface oxidation and the attendant setting of the color and shape of the meat, the meat is rapidly packaged in an envelope of a shrinkable film material, and the envelope is evacuated to remove air and prevent a further material degree of oxidation, as well as to pull the film onto the surface of the meat and minimize the voids within which transfer of moisture and vapor may take place. The envelope must be suitably sealed to hold the vacuum, as by means of a clamp or by a cement or by cohesion of the plastic film material to itself under suitable conditions. The package is then subjected to heat conditions which cause the film to shrink tightly around the meat, and at the same time to thaw the surface of the meat slightly or enough to melt the surface crystals and release the juices and flavor and bring out the original color. The skin tight film is impervious to air, moisture, and external odors, and its shrinkage reduces the voids at the surface and prevents any interchange of moisture and vapor which might result in further crystallization at the surface and a loss of desirable characteristics. Thereafter the meat in the sealed package is subjected to a rapid deep freezing action in the absence of oxidizing conditions, which preserves the meat in its optimum qualities.

As a specific example of this invention, beef may be ground to the desired texture and formed into patties of desired size. These patties are stacked in a group of required package size with suitable separators therebetween, such as a paper treated with silicone which prevents adhesion on freezing. The meat is frozen in two stages, in which the first stage involves a controlled surface oxidation of the meat, and the final stage involves a complete preservation of such characteristics as have been previously developed.

In the first freezing stage, the stacked meat patties are placed in a freezer at —20° F. to —40° F. and there held long enough to form a hard frozen crust, and to oxidize the surface layer. The oxidation may be accomplished by blowing a blast of cold air onto the meat, in which the air is held at a temperature of about —20° F. to —40° F. Freezing of the patties or other form of meat may also be accomplished by other common methods of freezing, such as contact or plate freezers. The oxidizing action serves to set the color, in that the meat particles at the surface have their juices stored in fine grained crystals, which may be released without evaporation or desiccation by a subsequent surface thawing after the meat has been sealed in an impervious envelope. That is, the crystals are held frozen and the juices cannot be lost by evaporation, nor can they be lost when the crystals are melted, because the thawing and release of the juices is accomplished while the meat is sealed in, and nothing can escape.

The meat in this surface frozen condition, and which is in fact frozen throughout the entire body, but presumably at a lower temperature at the surface, is placed in a bag of a preferably transparent oriented film material which is capable of being shrunk tightly onto the body of the meat. The neck of the bag is suitably affixed to a suction nozzle which is connected with a high-vacuum pump and the air is withdrawn from the bag to a sufficient extent to cause the bag to collapse and the film to cling tightly to the surface of the meat. The neck of the bag may be twisted between the nozzle and the main body of the meat and then sealed by any suitable means to retain the vacuum within the bag. This procedure is accomplished rapidly and the frozen condition of the meat has not changed to a material extent. That is, the surface layer remains frozen with the juices in a fine crystalline condition, and with the surface layers oxidized to a controlled extent.

The next stage of the process is to release the juices which are stored in the fine surface crystals and cause their dissemination over the surfaces of the meat. This can now be safely accomplished since the meat is sealed in the absence of any material amount of air so that there can be no further oxidation. One suitable procedure for thawing that surface layer, and which also accomplishes a shrinkage of the film into tight contact with the meat body, is to pass the sealed bag and its contents through a hot water bath or a spray of water or air maintained at about 200° F. to 212° F. or to subject the same to a quick treatment with a low pressured steam jet. The film of the bag has been selected to accomplish this shrinking action and form a very tight seal around the meat, and for that purpose a film of oriented rubber hydrochloride or vinylidene chloride is preferably employed, although other suitable material may be adopted for the purpose. The treatment with the hot water or steam is accomplished very quickly and in a few seconds. This serves to thaw just the hard frozen surface layer of the meat but without thawing the interior of the body. Consequently, the meat juices held frozen in the fine surface crystals are released onto the adjacent meat surface and the natural meat color is accordingly brought out. Since the surface of the meat is fully protected from exposure to air, there can be no further oxidation when the meat is subsequently refrozen. Hence the juices will remain in that surface layer and the color will be satisfactorily red.

The final freezing stage is now carried on before the body of the meat has thawed by quickly returning the sealed bag of patties to the freezer and completely and rapidly freezing the meat at a suitable temperature such as −20° F. to −40° F. In this freezing operation the color is not materially affected and the meat retains its natural color, due to the elimination of oxidizing conditions.

If the beef is in the form of suitably trimmed portions and is not ground to form hamburg patties, the meat may be initially frozen to a solid condition at −20° F. to −40° F. and it is thereafter "tempered" to about the crystallization point of 28° F., or slightly below. This may be accomplished by subjecting the meat to a limited surface oxidation at a suitable temperature just above the freezing point of meat. Temperatures materially above this point tend to cause deterioration to begin on the surfaces before the interior portion has reached the desired temperature.

This "tempered" body of meat may then be readily cut into steaks, chops, roasts, etc. either with or without the bones, depending upon the cut that is desired. At this temperature controlled oxidation of the freshly exposed surfaces is readily effected. The beef cuts are then rapidly subjected to the treatment above described wherein they are placed in the bags of oriented film and the air is exhausted. This bag is passed through the hot water to thaw the surface layer and release the color. Then the meat is frozen solid.

If other types of meat, such as suitably trimmed pork, lamb or veal are to be preserved in this manner, these may be initially frozen to a solid condition at about −20° F. to −40° F. and then directly sawed or cut as desired and packed in the bags without the above described tempering treatment, since color development is not of the same importance as with beef. After the bag has been sealed, the body is passed through the hot air or steam or water spray to thaw the surface of the meat and release the juices in the surface crystals and bring out the color. Thereafter, the meat may be frozen to its final hard condition while it is protected from air by the bag and so the surface cannot be detrimentally affected.

The initial oxidation treatment is continued only long enough to oxidize the surface portions of the raw or fresh meat to the required intermediate oxidation stage, and any further air exposure is undesirable. That is, the oxidation control is accomplished by freezing the meat in a blast of the cold air at a temperature of −20° F. to −40° F. within a limited time, such as forty minutes for ground meat patties or one hour per inch in depth for solid meat, or to a predetermined depth of oxidation penetration. For meat that has a substantially continuous surface, the oxidation penetrates only slightly; whereas, for ground meat, the oxidation is preferably discontinued by the time it has penetrated to a depth of not over about 1/8 of an inch, which is considered a shallow oxidation. Ground meat oxidizes rapidly, but this is retarded when the temperature is lowered to about 28° F. and soon practically stops due to the chemical reaction slowing down as the temperature is reduced.

If the meat is to remain solid and not be ground, it may be solidly frozen initially and then warmed up to about 28° F., at which temperature it may be sliced. It may also be sawed in the frozen condition, and the individual pieces allowed to come up to the crystallization point of about 28° F. At this temperature and under either method of treatment, exposure to the air effects almost immediate oxidation of the surfaces. Since the temperature of the entire place is at the crystallization point, excessive oxidation is prevented by rapidly placing the meat in its impervious envelope, evacuating, and sealing, and quickly refreezing. The entire time of the operation after reaching the crystallization temperature should not exceed ten minutes. Allowing the cuts to come appreciably above the crystallization temperature would not only result in excessive oxidation, but would also result in mechanical loss of juices and flavor.

Likewise, the heat treatment produced by a blast of warm air, water or steam, or by dipping the sealed bag in a hot water bath, is carried on only for a sufficient time, such as a few seconds, to cause the desired shrinkage of the enveloping film and the melting of only the crystals adjacent to the enveloping film. Hence the intermediate procedure prior to the second stage of freezing is carried on quickly, preferably in less than ten minutes and in a refrigerated area, ordinarily not above about 45° F.

This treatment preserves the freshness of the meat and seals it from external gases, moisture and odors, as well as detrimental bacterial or other influences. The meat has a satisfactory red color, firmness of texture and other desired qualities and it retains more of its juices than heretofore found in frozen meats. Because of its sealed protection, the meat has not lost weight or desired substance by desiccation or evaporation of the crystalline materials. Any further oxidation or change of color is prevented by the exclusion of air. The meat may be frozen and packaged economically at a central location, shipped long distances in a clean and dry condition, and stored for a longer period than heretofore prior to sale or use without weight loss due to dehydration, or other deteriorative effects. Other advantages will be readily apparent to one skilled in the art.

It will be understood that various modifications may be made in the procedure and that the above disclosure is to be interpreted as setting forth the principles of the invention and preferred methods thereof and not as imposing limitations on the appended claims.

I claim:

1. The method of making frozen patties of fresh meat comprising the steps of grinding meat to a desired texture, shaping patties therefrom, interleaving several patties with separators, subjecting the patties to a temperature between about —20° F. and —40° F. and freezing the surfaces of the patties rapidly in a controlled oxidizing atmosphere to oxidize a shallow surface layer of not over about ⅛ inch depth and to form fine surface crystals of the juices and set the color thereof, placing the patties in an envelope of shrinkable film which is substantially impervious to air and moisture, evacuating air therefrom, sealing the envelope, heating the envelope and the surface portion only of the meat therein by subjecting it for a few seconds to a temperature of about 200° to 212° F. to shrink the film into tight engagement with the meat and to melt the surface crystals and bring out the color of the juices without detrimentally melting the interior of the meat, and then rapidly freezing the sealed meat solidly in a temperature below about —20° F.

2. The method of freezing meat comprising the steps of subjecting fresh meat of a natural color to a temperature of about —20° F. to —40° F. and oxidizing only a shallow surface layer of a limited depth of not over about ⅛ inch and stopping the oxidation at an intermediate stage which will provide a required final color, sealing the frozen meat without material delay in a substantially air and moisture impervious closely fitting envelope and preventing further oxidation and undesired color change, quickly heating the meat for a few seconds in a bath having a temperature of about 200° to 212° F. to melt the crystals of only the surface layer of the sealed frozen meat without materially affecting the interior so as to release the juice content of the surface crystals and regenerate the color of the meat, and subsequently freezing the meat to a solid condition while it remains sealed in its envelope and thereby preserving the meat color of the intermediate oxidation stage.

3. The method of freezing meat comprising the steps of subjecting the meat to a temperature between about —20° F. and —40° F. to freeze the same and treating it with air to oxidize its surface portion while the meat temperature is not materially below its freezing point, and limiting the oxidation to a depth of not over about ⅛ inch, sealing the frozen and oxidized meat without material delay in an air and moisture impervious envelope and excluding any material amount of air therefrom to prevent further oxidation and desiccation, rapidly heating the oxidized surface layer for a few seconds in a bath having a temperature of about 200° to 212° F. to melt juice crystals thereof without materially affecting the frozen interior of the meat and then freezing the meat to a solid condition for preservation.

4. The method of freezing a fresh meat comprising the steps of freezing the meat to a solid condition, raising the temperature of only the surface layer to about 28° F. while exposing the meat to the oxidizing action of air and causing a shallow oxidation of the meat surface to a depth of not over about ⅛ inch and setting the color of the surface layer, thereafter sealing the frozen meat in an air and moisture impervious envelope and removing air to minimize further oxidation, heating the surface of the meat for a few seconds in a bath having a temperature of about 200° to 212° F. and thawing the surface crystals to release their juices, while the body remains substantially frozen in its sealed envelope, and then lowering the temperature thereof to provide a solidly frozen mass.

5. The method of freezing fresh meat comprising the steps of freezing the meat in a first stage by directing against it a blast of air at a temperature between about —20° F. and —40° F. and during the freezing stage maintaining an oxidizing condition for a limited time of not over about 40 minutes to oxidize and set the color in a shallow surface layer, placing the frozen meat in an air and moisture impervious envelope, withdrawing air and sealing the envelope to limit further oxidation, subjecting the surface portion only of the sealed meat for a few seconds to a temperature of about 200° F. to 212° F. and rapidly thawing the crystals of the oxidized layer to release their juices without melting the interior of the meat, and thereafter quickly freezing the meat solidly in its sealed envelope at a temperature of about —20° F. to —40° F.

References Cited in the file of this patent
UNITED STATES PATENTS

| | | |
|---|---|---|
| 1,838,000 | Rumsey | Dec. 22, 1931 |
| 2,052,221 | Dubil | Aug. 25, 1936 |
| 2,140,162 | McKee | Dec. 13, 1938 |
| 2,376,583 | De Poix | May 22, 1945 |

OTHER REFERENCES

"Modern Packaging," September 1950, pages 93, 94, 95, 199 and 201.

"Food Engineering," November 1953, page 133.

"The National Provisioner," November 14, 1953, pages 37 and 38.